United States Patent [19]

Obayashi et al.

[11] Patent Number: 5,566,358

[45] Date of Patent: Oct. 15, 1996

[54] MOBILE RADIO COMMUNICATION APPARATUS FOR REGISTERING A LOCATION

[75] Inventors: Arata Obayashi; Takashi Sakagawa, both of Tokyo, Japan

[73] Assignee: Kabushiki Kaisha Toshiba, Kanagawa-ken, Japan

[21] Appl. No.: 399,292

[22] Filed: Mar. 6, 1995

[30] Foreign Application Priority Data

Mar. 7, 1994 [JP] Japan ................................. 6-035586

[51] Int. Cl.⁶ ................................ H04B 1/00; H04B 7/00
[52] U.S. Cl. ..................... 455/54.1; 455/33.1; 455/34.2
[58] Field of Search ............................. 455/33.1, 33.2, 455/54.1, 53.1, 56.1, 34.1, 33.4, 34.2; 379/59, 60

[56] References Cited

U.S. PATENT DOCUMENTS

| | | | |
|---|---|---|---|
| 4,392,242 | 8/1983 | Kai | 455/34.1 |
| 4,905,301 | 2/1990 | Krolopp et al. | 455/34.1 |
| 5,305,371 | 4/1994 | Saegusa et al. | 455/33.4 |
| 5,309,503 | 5/1994 | Bruckert et al. | 455/33.2 |
| 5,404,573 | 4/1995 | Yabe et al. | 455/34.2 |

*Primary Examiner*—Reinhard J. Eisenzopf
*Assistant Examiner*—Gertrude Arthur
*Attorney, Agent, or Firm*—Finnegan, Henderson, Farabow, Garrett & Dunner, L.L.P.

[57] ABSTRACT

A mobile radio communication apparatus includes a common channel detecting unit which judges whether or not a paging channel and an access channel which are assigned to one base station are common based on a predetermined parameter (CPA) which is transmitted from the base stations. If the CPA indicated a predetermined value indicating that the paging channel and the access channel are common channel, then a memory stores that information representing the base station which transmits the strongest level of all the received access channel at an input of a receiver of the mobile radio communication apparatus.

4 Claims, 5 Drawing Sheets

MOBILE RADIO COMMUNICATION APPARATUS FOR REGISTERING A LOCATION

BACKGROUND OF THE INVENTION

1. Field of the Invention

This invention relates to the field of radio communication apparatus such as mobile telephones, portable telephones and cordless telephone. More specifically, this invention relates to a location registration of a mobile communication apparatus used as a mobile unit in a cellular radio system.

2. Description of the Related Art

Recently, many kinds of mobile communication systems have been developed and used.

One such system is a cellular radio communication system.

FIG. 5 shows a schematic view of a cellular radio communication system. This system has a control station CS, plurality of base station, for example, BS1–BS3, and plurality of mobile units, for example, MS 1–MS 7. Control starion CS is connected to a wire telephone network NW through wire circuit CL. Base stations BS1–BS3 are connected to control station CS through wire circuits CL1–CL3, respectively. Base stations BS1–BS3 from radio zones E1–E3, which are called cells, respectively.

A group of radio communication channels are assigned to each radio zone E1–E3. Some of each of radio communication channels assigned to each base station has a different frequency. The group of radio communication channels includes a control channel and a speech channel. The control channel can be classified into two types—a paging channel (P-ch) and an access channel (A-ch). The paging channel can be used to transmit a paging signal from the base station to the mobile station. The access channel can be used to transmit an originating signal or a response signal from the mobile station to the base station. The access channel can be used to transmit a control signal which is needed for a connection between the mobile station and the base station.

In this kind of system, the base station have to know a place where the mobile station is located for paging the mobile station.

In an idle status, the mobile station searches the paging channel for example every fifteen minutes and detects the paging channel which indicates the strongest level of all the received paging channels. Next, the mobile station compares the paging channel with a paging channel which detected at the time of recent location registration. If these two paging channels are not the same channel, the mobile station recognizes that it moves to the other cell. Next, the mobile station searches an access channel and detects the access channel (Amax) which indicates the strongest level of all the received access channels. The mobile station transmits a location registration information to the base station which transmits the access channel (Amax). The location registration information includes an identification number of the mobile station. The base station registers the location where mobile station is located. The mobile station memorizes a number representing the paging channel in a memory (not shown) and goes back to the idle status. When the mobile station is located near the base station, the mobile station can detect both an access channel and a paging channel as a strongest channel from the same base station.

But when the mobile station is located on a boundary area which is formed by a plural cells, the mobile station can't detect the strongest access channel from the base station which transmits the strongest paging channel to the mobile station. The mobile station may detect the access channel and the paging channel from the different base station. In this case a paging signal can't be transmitted to the mobile station.

An explanation of this kind of error is provided next.

As shown in FIG. 6, the mobile station MS2 is located in a boundary area which is formed by cell E1 and E2. It is assumed that the location of the mobile station MS2 is registered at the base station BS1. The mobile station is going to make location registration to a base station. It is assumed that a received signal level of access channel XA1 transmitted from the base station is stronger than access channel XA2 transmitted from the base station BS2 at the input of a receiver (not shown) of the mobile station.

On the other hand it is assumed that a received signal level of paging channel XP2 transmitted from the base station BS2 is stronger than XP1 transmitted from the base station BS1. In this case mobile station MS2 makes a location registration to the base station BS1 by using the access channel XA1 and memorizes a number representing the paging channel XP2 in a memory for the location registration (not shown). So the base station (BS1) which registers the location of the mobile station MS2 does not coincides with the base station (BS2) which pages the mobile station MS2.

The mobile station MS2 moves to near the base station BS1 as shown in FIG. 7 and makes a location registration. The mobile station MS2 detects paging channel XP1 as the strongest level to the mobile station. So this paging channel XP1 doesn't coincides with the paging channel XP2 which has already memorized in the memory for the location registration (not shown).

The mobile station recognizes that it moves to the other cell and make a location registration to the base station by using the access channel XA1 which indicates the strongest level of all the access channels at the input of the receiver (not shown). The base station which registers a location of the mobile station MS2 coincides with a base station which pages the mobile station MS2. So the paging signal can be transmitted to the mobile station from the base station BS1 by using the paging channel XP1.

But, the mobile station MS2 moves to near the base station BS2 as shown in FIG. 8 and makes a location registration. The mobile station MS2 detects paging channel XP2 as the strongest level to the mobile station. So this paging channel XP2 coincides with the paging channel XP2 which has already memorized in the memory for the location registration (not shown). The mobile station MS2 doesn't recognizes that it moves to the other cell, so the mobile station MS2 recognizes that it doesn't need the location registration. The mobile station MS2 is located in cell E2, but the location of the mobile station MS2 is registered at the base station BS1. In this situation, a paging signal to the mobile station MS2 is transmitted through the paging channel XP1 from the base station BS1. So the paging signal is not transmitted to the mobile station MS2 which is located in cell E2.

SUMMARY OF THE INVENTION

It is an object of the present invention to provide a mobile radio communication apparatus for surely registering its location to the base station.

To attain one object, as embodied and described herein, there is provided a mobile radio communication apparatus according to the present invention comprising first receiving means for receiving a paging channel used to page the mobile radio communication apparatus, and for detecting a paging channel having a strongest level of all the received paging channels, channel memory means for storing information identifying a base station which transmits the detected paging channel, said first receiving mean including second receiving means for receiving an access channel used by the mobile radio communication apparatus to access the base station, and for detecting an access channel having a strongest level of all the received access channels; means for indication a base station which transmits the detected access channel, means for transmitting location registration information to the identified base station through the detected access channel, means for judging whether each said received paging is common with one of said received access channels based on a predetermined parameter transmitted from each said base station, and said channel memory means for storing identification information of said identified base station when said judging means judges that one of said received paging channels and said detected access channel are common.

The mobile radio communication apparatus according to the present invention comprising first receiving means for receiving a paging channel used to page the mobile radio communication apparatus, and for detecting a paging channel having a strongest level of all the received paging channels, channel memory means for storing an identification number of the detected paging channel, said first receiving means including second receiving means for receiving an access channel used by the mobile radio communication apparatus to access the base station, and for detecting an access channel having a strongest level of all the received access channels, mean for identifying an identification number of the detected access channel, means for transmitting location registration information to a base station which transmits the detected access channel, means for judging whether each said received paging is common with one of said received access channels based on a predetermined parameter transmitted from each said base station,and said channel memory means for storing the identification number of the detected access channel when said judging means judges that one of said received paging channels and said detected access channel are common.

To attain said object as embodied and described herein, there is provided a method for a location registration of a mobile radio communication apparatus for use in a cellular radio communication system in which radio communication signals are transmitted over a radio link between the mobile radio communication apparatus and a base station comprising the step of: (a) receiving a paging channel used to page the mobile radio communication apparatus; (b) detecting a paging channel having a strongest level of all the received paging channels; (c) storing information identifying a base station which transmits the detected paging channel; (d) receiving an access channel used by the mobile radio communication apparatus to access the base station; (e) detecting an access channel having a strongest level of all the received access channels; (f) indication a base station which transmits the detected access channel; (g) transmitting location registration information to the identified base station through the detected access channel; (h) judging whether each said received paging is common with one of said received access channels based on a predetermined parameter transmitted from each said base station; and (i) storing identification information of said identified base station when that one of said received paging channels and said detected access channel are common.

The method for a location registration of a mobile radio communication apparatus comprising the step of: (a) receiving a paging channel used to page the mobile radio communication apparatus; (b) detecting a paging channel having a strongest level of all the received paging channels; (c) storing an identification number of the detected paging channel; (d) receiving an access channel used by the mobile radio communication apparatus to access the base station; (e) detecting an access channel having a strongest level of all the received access channels; (f) identifying an identification number of the detected access channel; (g) transmitting location registration information to a base station which transmits the detected access channel; (h) judging whether each said received paging is common with one of said received access channels based on a predetermined parameter transmitted from each said base station; and (i) storing the identification number of the detected access channel when one of said received paging channels and said detected access channel are common.

BRIEF DESCRIPTION OF THE DRAWINGS

The accompanying drawings, which are incorporated in and constitute a part of the specification, illustrate presently preferred embodiment of the invention, and together with the general description given above and the detailed description of a preferred embodiment given below, serve to explain the principles of the invention.

DETAILED DESCRIPTION OF THE PREFERRED EMBODIMENT

Figure 1:
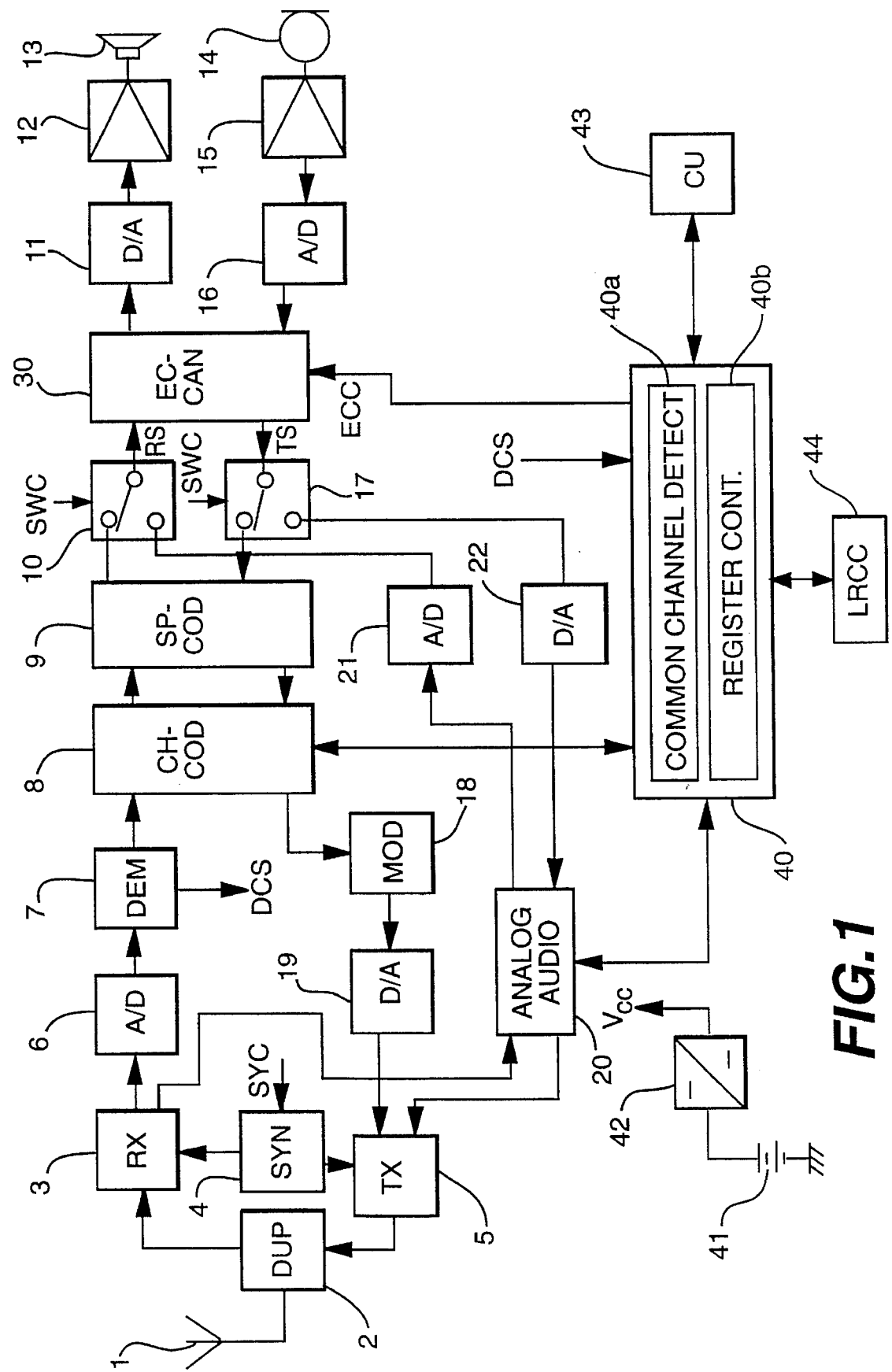
FIG. 1 is a circuit diagram, showing a mobile cellular radio communication apparatus according to a embodiment of the invention.

FIG. 1 shows a circuit diagram, showing a mobile cellular radio communication apparatus according to an embodiment of the invention.

This mobile cellular radio communication apparatus is used as a mobile unit of a dual mode cellular radio communication system. This dual mode cellular radio communication system is a system which employs an analog mode and a digital mode.

First, the portion of the circuit related to the digital mode is described.

Switch circuit 10, 17 are controlled by a switch control signal SWC supplied from controller 40 so that switch 10 selectively outputs the digital signal output from speech-codec 9 and switch 17 selectively outputs the digital signal output from echo-canceller 30 to speech-codec 9.

Figure 5:
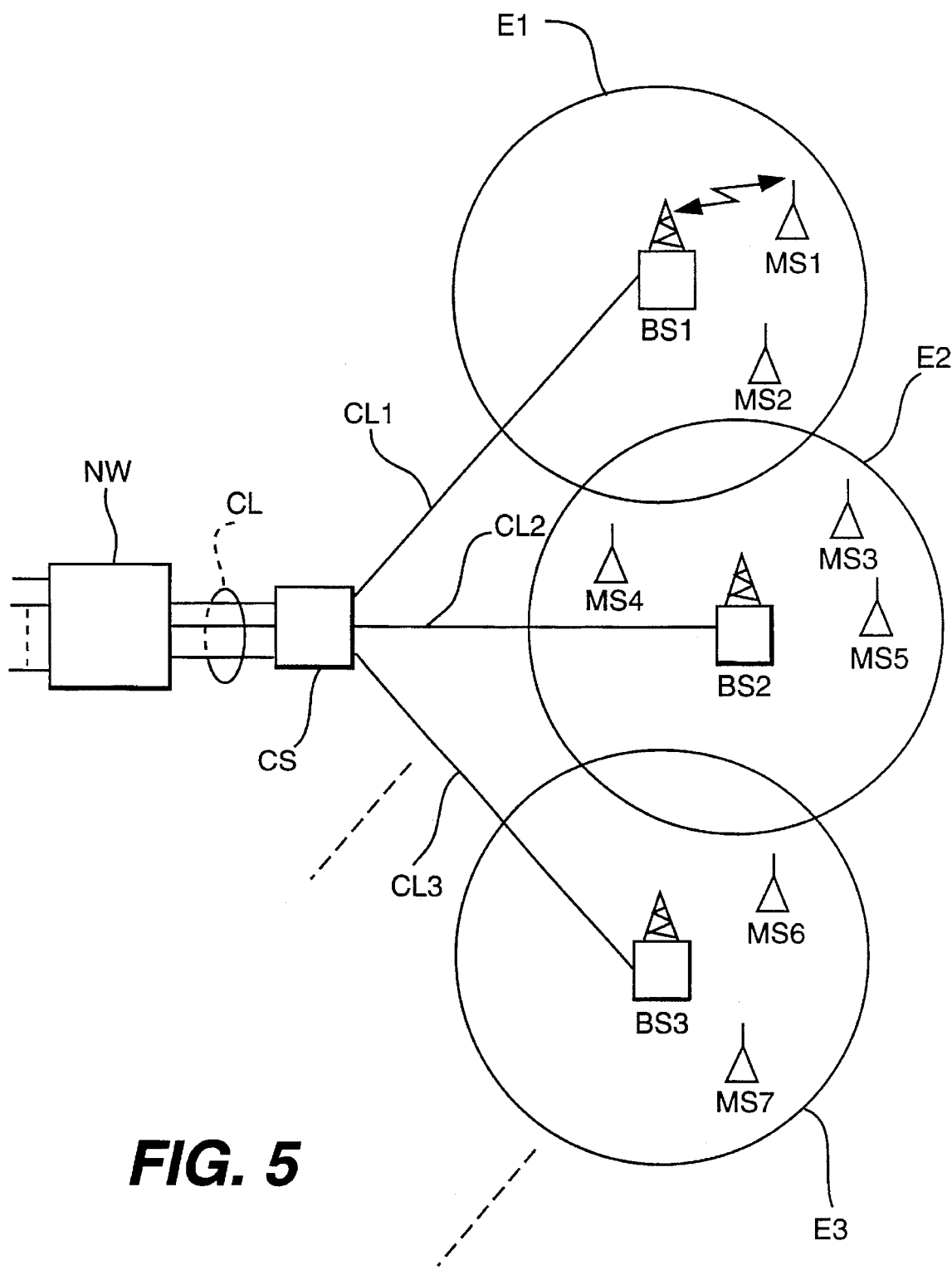
FIG. 5 shows an example of an arrangement of a cellular radio communication system.
Figure 6:
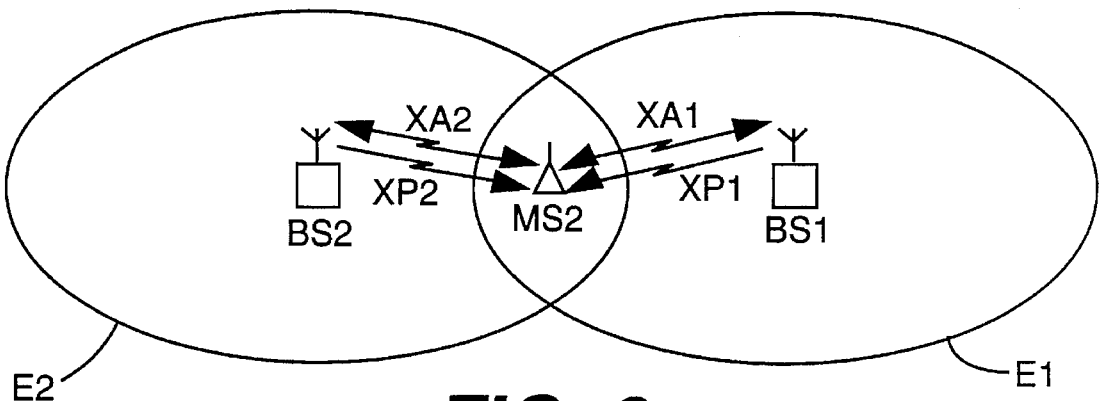
FIG. 6 is a chart for explaining the operation of the registration of the location performed by conventional the mobile cellular radio communication apparatus.
Figure 7:
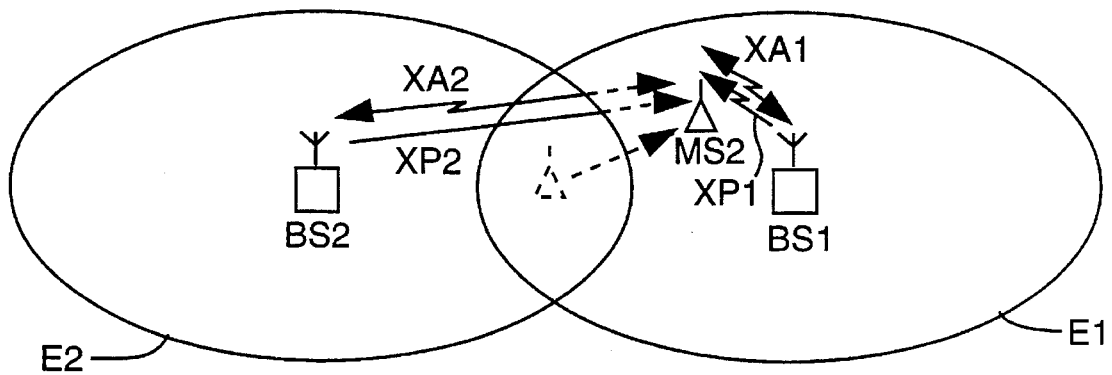
FIG. 7 is a chart for explaining the operation of the registration of the location performed by conventional the mobile cellular radio communication apparatus.
Figure 8:
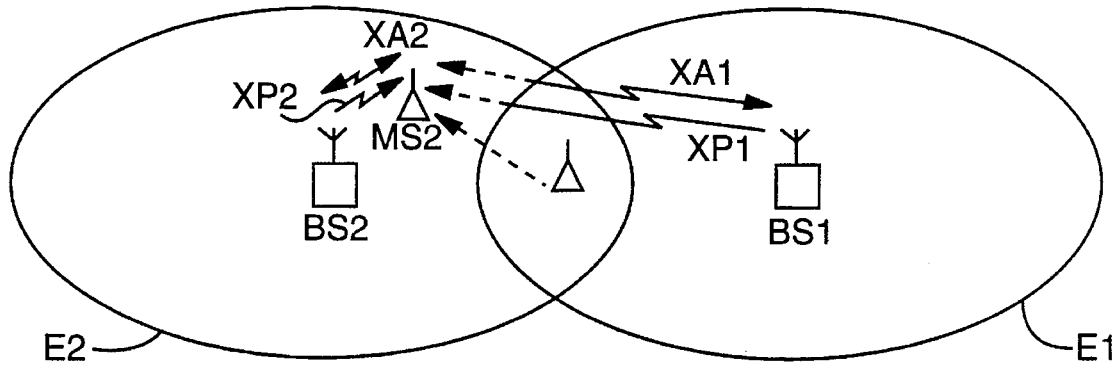
FIG. 8 is a chart for explaining the operation of the registration of the location performed by conventional the mobile cellular radio communication apparatus.

A radio frequency signal, supplied from each of the base stations BS1–BS3 shown in FIG. 5 through a corresponding one of digital speech channels when the digital mode is set, is received by an antenna 1 and then input to a receiver 3 via a duplexer 2. Receiver 3 combines the radio frequency signal with a receiver oscillation signal output from a frequency synthesizer 4, thereby forming an intermediate frequency signal. The frequency of the receiver oscillation signal from frequency synthesizer 4 is controlled by a channel control signal SYC output from a controller 40. The intermediate frequency signal is converted into a digital signal by means of an A/D converter 6, and is then input to a digital demodulator 7. Demodulator 7 demodulates the digital signal into a digital base band signal. The digital base band signal includes a digital received speech signal and a digital control signal DCS. The digital control signal DCS is supplied to controller 20, where the signal is recognized.

The digital received speech signal has its demodulated waveform equalized by means of an equalizer (not shown), and is then supplied to a channel-encoder/decoder (hereinafter referred to as "channel-codec") 8. Channel-codec 8 performs decoding processing for correcting an error in the digital speech signal supplied from the equalizer, and outputs the corrected digital speech signal to a speech-encoder/decoder ( hereinafter referred to as "speech-codec") 9.

Speech-codec 9 performs speech decoding processing of the corrected digital speech signal. The speech signal output from speech-codec 9 passes echo-canceller 30 and is converted to an analog speech signal by means of a D/A converter 11. The analog speech signal output from D/A converter 11 is supplied to a speaker 13 via an amplifier 12, and a speech corresponding to the speech signal is output therefrom.

Still with respect to the digital mode, a transmission speech signal which is output from a microphone 14 is input to an A/D converter 16 via an amplifier 15. Thus, the transmission speech signal is converted into a digital transmission speech signal by means of A/D converter 16 and is then input to echo-canceller 30. Echo-canceller 30 cancels the echo which is including in the transmission speech signal. Digital transmission speech signal TS which is output from echo-canceller 30 is supplied to speech-codec 9 via switch circuit 17.

Speech-codec 9 performs a speech encoding processing of the digital transmission speech signal. The digital transmission signal which is output from speech-codec 9 is input to channel-codec 8, together with the digital control signal which is supplied from controller 40. Channel-codec 8 performs encoding for correcting errors in the digital transmission speech signal and the digital control signal. The encoded digital transmission signal is input to a digital modulator 18 (MOD).

Modulator 18 generates a modulation signal which is obtained by subjecting the digital transmission signal to a /4 shifted DQPSK modulation. The modulation signal is converted into an analog signal by means of a D/A converter 19 and is then input to a transmitter 5 (TX). Transmitter 5 synthesizes the modulation signal and a transmitter oscillation signal which is output from the frequency synthesizer 4 corresponding to a control signal (SYC) supplied from controller 40. As a result, transmitter 5 generates a radio transmission signal which has high frequency and high amplitude. Thus the radio transmission signal is output to antenna 1 via duplexer 2, and transmitted to the base station.

The analog mode is described next. When the analog mode is set, switch circuit 10, 17 are controlled by switch control signal SWC supplied from controller 40 to switch the side of an analog audio circuit (ANALOG AUDIO) 20. In the analog mode, a radio frequency signal, which is supplied from each of the base station BS1–BS3 through a corresponding one of analog speech channels, is received by antenna 1 and then input to receiver 3 via duplexer 2. Receiver 3 converts the radio frequency signal into an intermediate frequency signal, which is output to analog audio circuit 20. Analog audio circuit 20 performs a frequency demodulation of the intermediate frequency signal and then performs speech amplification of the demodulated signal. An analog received signal which is output as a base band signal from analog audio circuit 20 is input to an analog/digital converter 21. Analog/digital converter 21 converts the analog received signal into the digital received signal. The digital received signal is input to echo-canceller 30. The digital received signal output from echo-canceller 30 is converted to an analog speech signal by means of D/A converter 11. The analog speech signal output from D/A converter 11 is supplied to a speaker 13 via an amplifier 12, and a speech corresponding to the speech signal is output therefrom.

A explanation of a transmission of a signal in the analog mode is provided next.

A transmission signal which is output from the microphone 14 is input to an A/D converter 16 via an amplifier 15. Thus, the transmission speech signal is converted into a digital transmission speech signal by means of A/D converter 16 and is then input to echo-canceller 30. Echo-canceller 30 cancels the echo which is including in the transmission speech signal. But in the analog mode, the lost of the communication quality is small. So echo-canceller 30 is not always set as a live condition. The output signal from echo-canceller 30 is supplied to a digital/analog converter 22 via switch circuit 17 and converted into an analog signal, and is supplied to analog audio circuit 20. Analog audio circuit 20 generates a modulation signal obtained by subjecting the transmission signal to FM modulation, and inputs the modulation signal to transmitter 5. Transmitter 5 combines the modulation signal with a transmitter oscillation signal output from frequency synthesizer 4. Transmitter 5 generates a radio frequency signal which has high frequency and high amplitude.

This radio frequency signal is output to antenna 1 via duplexer 2, and is then transmitted to the base station. Referring to the FIG. 1, a console unit 43 is provided. Console unit 43 includes a key pad 31 and a display 32. The key pad 31 includes numeric digit keys used as dial keys, a one-touch dial key and a function key group. The function key group includes a sending key to be operated to originate a call, an end key to be operated to finish the call, and an alphabet input key to be operated to input alphabetic characters on the numeric keys. Display 32 is provided, for example, as a liquid crystal display (LCD) which shows the operative condition of the telephone unit or the telephone number of a destination terminal, etc., in response to a signal supplied from controller 20. Power source circuit 34 generates a desired operational voltage Vcc on the basis of the output of a battery 33, and supplies the voltage to the above-described various circuits.

Controller 40 includes a cpu (not shown) which is, for example, in the form of microcomputer. Controller 40, controls, for example, a channel connection and a speech control by using a microprocessor. Controller 40 includes a common-channel detecting unit 40a and a location register control unit 40b. These units performs as a control unit for the location registration of the mobile cellular radio communication apparatus.

When the mobile radio communication apparatus is an idle status, common-channel detecting unit 40a detects a CPA parameter which was included in a system parameter overhead of a paging channel broadcasted by the base stations. Common-channel detecting unit 40a detects whether or not both frequency of a paging channel and an access channel transmitted from same base station is the same frequency or not from a value of the CPA parameter.

Normally, when the system assigns same frequency for the paging channel and the access, the CPA parameter is "1", but when the system assigns different frequency for the paging channel and the access channel to each base station, the CPA parameter is "0".

When the mobile cellular radio communication apparatus make the location registration, location register unit 40b detects the paging channel and the access channel which indicates the strongest level of all the received paging channel and access channel at the input of receiver 3.

In accordance with the result of the detection, a last registration control channel memory (herein after referred to as "LRCC") 44 memorizes a number representing the detected access channel as a new paging channel when the system assigns same frequency for the paging channel and the access channel to each base station.

On the other hand when the system assigns the different frequency for the paging channel and the access channel to each base station, LRCC 44 memorizes a number representing the detected paging channel as a new paging channel.

Figure 2:
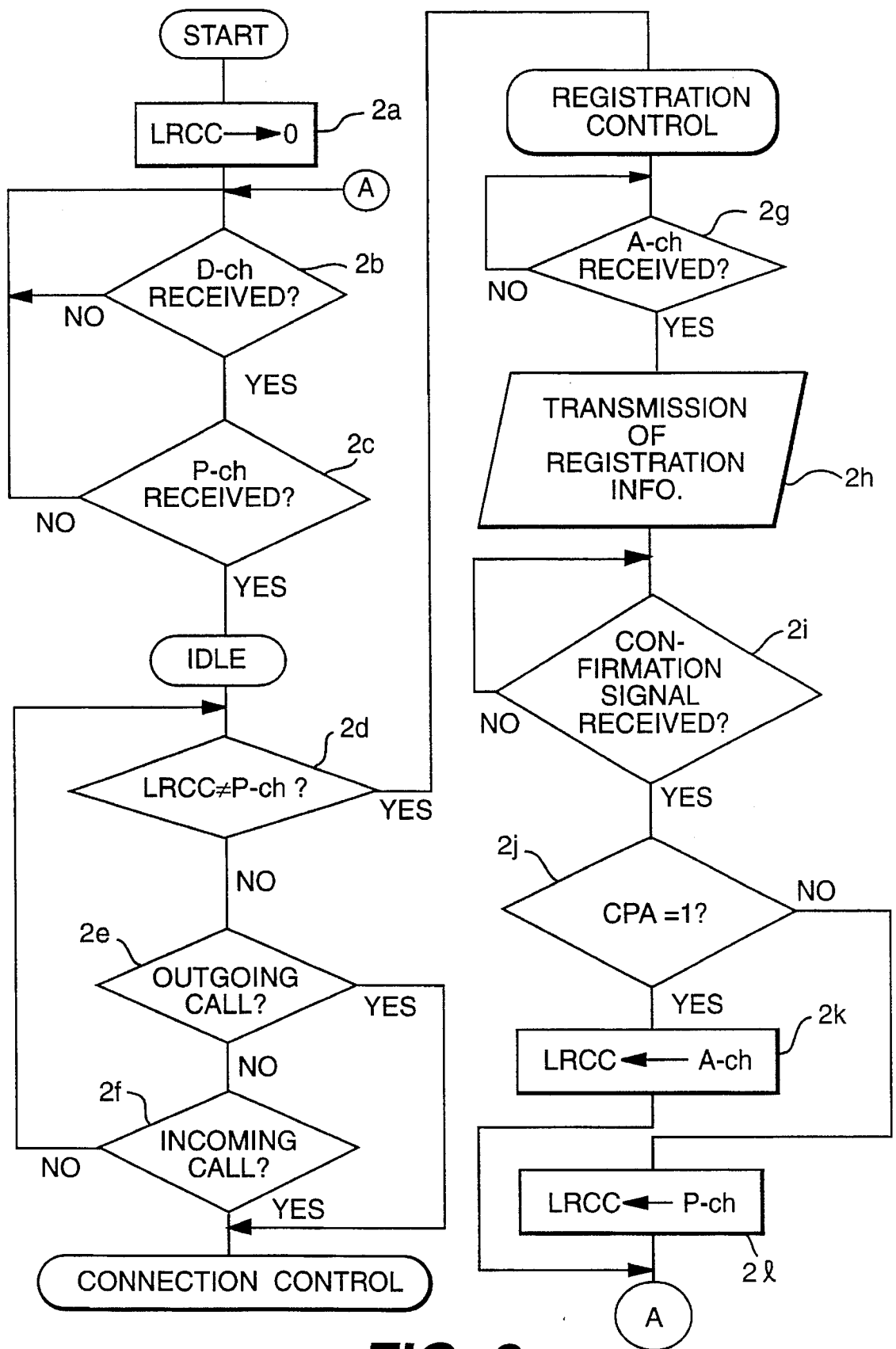
FIG. 2 is a flowchart for showing controlling steps of the registration of the location performed by a controller of the mobile cellular radio communication apparatus according to the embodiment of the invention.

FIG. 2 is a flow-chart showing a procedure of controller 40. When the power of the mobile cellular radio communication apparatus is ON, controller 40 initiates common-channel detecting unit 40a and location register control unit 40b and make them into a paging status. Next, the content of LRCC 44 are cleared (STEP 2a). One of control channels, dedicated channel (D channel) is received (STEP 2b). The dedicated channel is used for the transmission of digital control information from either the base station or the mobile cellular radio communication apparatus. The dedicated channel is not related to the present invention directly, so the brief explanation is not provided.

After the confirmation of the reception of the D channel, the mobile cellular radio communication apparatus begins to search the paging channels (STEP 2c).

When location register control unit 40b detects a paging channel which indicates the strongest level at the input of receiver 4, the apparatus goes into the idle status and watches the detected paging channel.

When the mobile cellular radio communication apparatus is in the idle status, controller 40 supervises the operation of the origination of a call and an incoming call (STEP 2e, 2f). At the same time, controller 40 watches whether a channel number which is contained in LRCC 44 coincide with a number representing the detected paging channel which indicates the strongest level at the input of receiver 4 or not ( STEP 2d). If the channel number contained in LRCC 44 doesn't coincide with the number representing the detected paging channel, the apparatus makes the location registration.

Controller 40 searches an access channel which indicates the strongest level at the input of receiver 4 (STEP 2g). Next, the mobile cellular radio communication apparatus transmits information of the request for the location registration to the base station by using the detected access channel. The information of the request for the location registration includes an ESN (electric serial number) and a telephone number of the mobile cellular radio communication apparatus.

When the base station receives such information from the mobile cellular radio communication apparatus, the base station registers the location where the mobile cellular radio communication apparatus is located now. Next, the base station responses a confirmation signal to the mobile station by using the access channel which is detected at STEP 2g.

After the mobile cellular radio communication apparatus receives the confirmation signal from the base station (STEP 2i), controller 40 refers the output of common-channel detecting unit 40a (STEP 2j). Common-channel detecting unit 40a has a value of the CPA parameter which is detected from the paging channel.

If the CPA parameter is "1", controller 40 recognizes that the system assigns same channel (frequency) for both the paging channel and the access channel to each base station. So the control circuit 40 makes LRCC 44 memorize the number representing the access channel which was used for the location registration at STEP 2g.

If the CPA parameter is "0", controller 40 recognizes that the system assigns different frequency for the paging channel and the access channel to each base station. As a result, controller 40 makes LRCC 44 memorize the number of the paging channel detected at STEP 2c (STEP 2l).

In the step 2g, it is OK that the control circuit 40 makes LRCC 44 memorize a number representing a base station which transmits the access channel which was used for the location registration. The number representing such base station which transmits the access channel can be acquired from the access channel or the detected paging channel. These are the procedure for the location registration of the mobile cellular radio communication apparatus. After the location registration, controller 40 confirms the reception of the D-channel and the paging channel as aforementioned STEP 2b and STEP 2c. The mobile cellular radio communication apparatus goes to the idle status again. Controller 40 compares every predetermined time that a channel number which is contained in LRCC 44 with a number representing a paging channel which indicates the strongest received level at the input of receiver 3.

Whenever these two numbers are not the same number, the abovementioned a request of the location registration is activated by the mobile cellular radio communication apparatus.

If these two numbers are the same number, the mobile cellular radio communication apparatus recognizes that it doesn't move the other cell and that it is not needed to activate the request of the location registration. In this case the mobile cellular radio communication apparatus goes to the idle status.

A example of the procedure of the above described is provided next.

Figure 3:
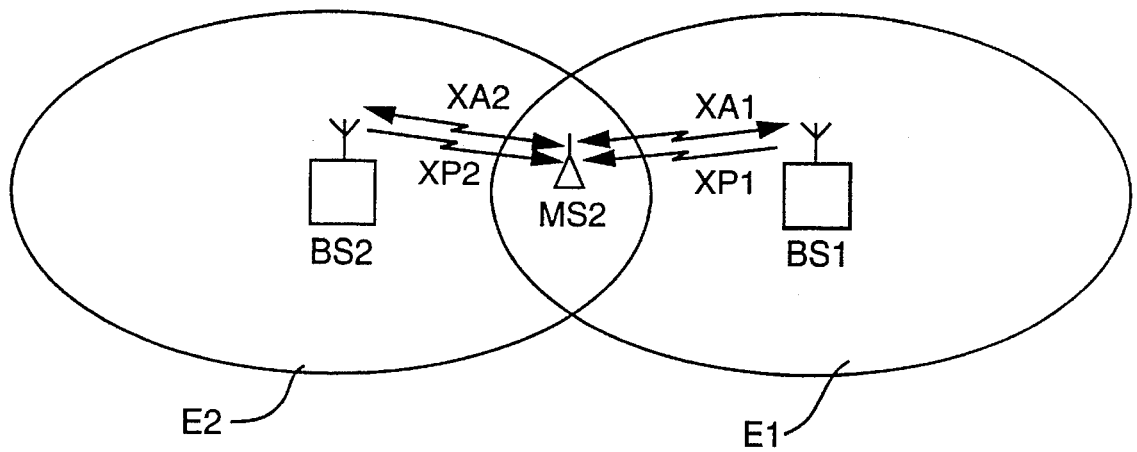
FIG. 3 is a chart for explaining the operation of the registration of the location performed by the mobile cellular radio communication apparatus according to the embodiment of the invention.
Figure 4:
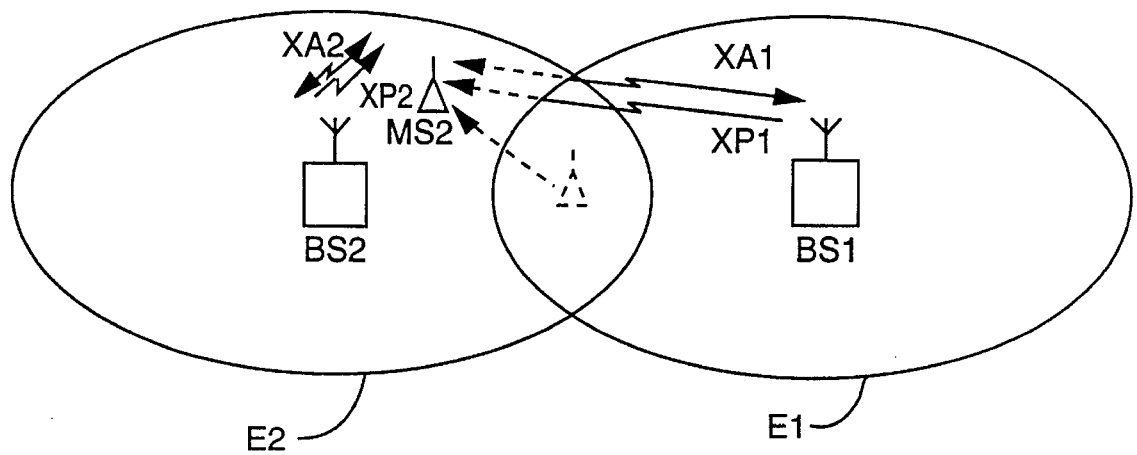
FIG. 4 is a chart for explaining the operation of the registration of the location performed by the mobile cellular radio communication apparatus according to the embodiment of the invention.

As shown in FIG. 3, mobile station MS2 is in a boundary area where is formed by cell E1 and cell E2. It is assumed that mobile station MS2 requests the location registration in this area. The received level of access channel XA1 at the input of the receiver of mobile station MS2 from base station BS1 is stronger than the received level of access channel XA2 from base station BS2.

In this case mobile station MS2 transmits the information representing the request of location registration to base station BS1 which transmits the access channel XA1. Mobile station MS2 confirms whether the system adopts the common channel for the paging channel and the access channel or not by checking the received CPA parameter. In this case, the CPA parameter is "1", which means the system assigns the same channel for the paging channel and the access channel.

Mobile station MS2 recognize that the system assigns the common channel for both the paging channel and the access channel to each base station, so controller 40 makes LRCC 44 memorize the access channel XA1 as the paging channel for mobile station MS2.

Mobile station MS2 moves to the area which is covered by base station BS2 where it doesn't register the location of mobile station MS2. Mobile station MS2 searches paging channels which indicates the strongest received signal level at the input of receiver 3 for the location registration. Mobile station MS2 detects paging channel XP2. Mobile station MS2 compares the channel number which has been already stored in LRCC 44 with the detected channel number representing paging channel XP2. In this case LRCC 44 stores the number represent access channel XA1. So mobile station MS2 recognize that it is necessary to make a new location registration. Mobile station MS2 searches access channels and detects an access channel which indicates the strongest received signal level at the input of the receiver 3. Mobile station MS2 transmits the information signal representing the request of the location registration to base station BS2 by using the detected access channel XA2. The system which is accessed by mobile station MS2 assigns the common channel for a paging channel and an access channel to each base station, so controller 40 makes LRCC 44 refresh the contents and memorize a number representing access channel XA2 as a new paging channel. After the location registration mobile station MS2 supervise a paging signal transmitted from base station BS2 through access channel XA2 stored in LRCC 44. In other words a base station which transmits a paging channel to mobile station MS2 becomes the same station which registers the location of mobile station MS2. So an incoming call is surely transmitted to mobile station MS2.

The mobile station explained in this embodiment can judge whether or not the accessed system assigns common channel for both a paging channel and an access channel to each base station by checking a CPA parameter which is transmitted from the base station. If the accessed system assigns common channel for both a paging channel and an access channel to each base station, the mobile station memorizes a number representing the access channel which indicates the strongest received level at the input of the receiver of the mobile station. In other words, the mobile station memorizes a number representing an access channel which is used for the location registration as a paging channel for the supervising an incoming call.

In this embodiment, when the mobile station is located in the boundary area as shown in FIG. 3, where a received a paging channel level from one cell is stronger than a received paging channel level from the other cell, although a received access channel level from said other cell is stronger than a received access channel level from said one cell, it is possible to register the location where the mobile station is located. Thereby, an incoming call is surely transmitted to the mobile station.

This invention is not limited to the above described embodiment. For example the user can request the location registration by pressing the key groups at the time of the call origination, or the incoming call etc.

What is claimed is:

1. A mobile radio communication apparatus for use in a cellular radio communication system in which radio communication signals are transmitted over a radio link between the mobile radio communication apparatus and one of a plurality of base stations, the mobile radio communication apparatus comprising:

first receiving means for receiving a paging channel used to page the mobile radio communication apparatus, and for detecting a paging channel having a strongest level of all the received paging channels;

channel memory means for storing an identification number of the detected paging channel;

said first receiving means including second receiving means for receiving an access channel used by the mobile radio communication apparatus to access the base station, and for detecting an access channel having a strongest level of all the received access channels;

means for identifying an identification number of the detected access channel;

means for transmitting location registration information to a base station which transmits the detected access channel;

means for judging whether each said received paging channels is common with one of said received access channels based on a predetermined parameter transmitted from each said base station; and said channel memory means for storing the identification number of the detected access channel when said judging means judges that one of said received paging channels and said detected access channel are common.

2. A mobile radio communication apparatus for use in a cellular radio communication system in which radio communication signals are transmitted over a radio link between the mobile radio communication apparatus and one of a plurality of base stations, the mobile radio communication apparatus comprising:

first receiving means for receiving a paging channel used to page the mobile radio communication apparatus, and for detecting a paging channel having a strongest level of all the received paging channels;

channel memory means for storing information identifying a base station which transmits the detected paging channel;

said first receiving means including second receiving means for receiving an access channel used by the mobile radio communication apparatus to access the base station, and for detecting an access channel having a strongest level of all the received access channels;

means for indicating a base station which transmits the detected access channel;

means for transmitting location registration information to the identified base station through the detected access channel;

means for judging whether each said received paging channels is common with one of said received access channels based on a predetermined parameter transmitted from each said base station; and said channel memory means for storing identification information of said identified base station when said judging means judges that one of said received paging channels and said detected access channel are common.

3. A method for a location registration of a mobile radio communication apparatus for use in a cellular radio communication system in which radio communication signals are transmitted over a radio link between the mobile radio communication apparatus and a base station comprising the steps of:

(a) receiving a paging channel used to page the mobile radio communication apparatus;

(b) detecting a paging channel having a strongest level of all the received paging channels;

(c) storing an identification number of the detected paging channel;

(d) receiving an access channel used by the mobile radio communication apparatus to access the base station;

(e) detecting an access channel having a strongest level of all the received access channels;

(f) identifying an identification number of the detected access channel;

(g) transmitting location registration information to base station which transmits the detected access channel;

(h) judging whether each said received paging channels is common with one of said received access channels based on a predetermined parameter transmitted from each said base station; and (i) storing the identification number of the detected access channel when one of said received paging channels and said detected access channel are common.

4. A method for a location registration of a mobile radio communication apparatus for use in a cellular radio communication system in which radio communication signals are transmitted over a radio link between the mobile radio communication apparatus and a base station comprising the steps of:

(a) receiving a paging channel used to page the mobile radio communication apparatus;

(b) detecting a paging channel having a strongest level of all the received paging channels;

(c) storing information identifying a base station which transmits the detected paging channel;

(d) receiving an access channel used by the mobile radio communication apparatus to access the base station;

(e) detecting an access channel having a strongest level of all the received access channels;

(f) indication a base station which transmits the detected access channel;

(g) transmitting location registration information to the identified base station through the detected access channel;

(h) judging whether each said received paging channels is common with one of said received access channels based on a predetermined parameter transmitted from each said base station; and (i) storing identification information of said identified base station when that one of said received paging channels and said detected access channel are common.

* * * * *